United States Patent [19]

Akitsu

[11] Patent Number: 4,958,860
[45] Date of Patent: Sep. 25, 1990

[54] VIBRO-ISOLATING JOINT

[75] Inventor: Yasuo Akitsu, Handa, Japan

[73] Assignee: NGK Insulators, Ltd., Japan

[21] Appl. No.: 361,361

[22] Filed: Jun. 5, 1989

[30] Foreign Application Priority Data

Jun. 10, 1988 [JP] Japan .................................. 63-144420

[51] Int. Cl.⁵ .............................................. F16L 11/12
[52] U.S. Cl. ..................................... 285/49; 285/114; 285/226; 285/906
[58] Field of Search .................... 285/226, 114, 49, 48, 285/906

[56] References Cited

U.S. PATENT DOCUMENTS

| 2,445,484 | 7/1948 | Kopperman | 285/114 X |
| 2,939,639 | 7/1960 | Coss | 285/49 X |
| 3,400,952 | 9/1968 | Swenson et al. | 285/114 |
| 3,633,945 | 1/1972 | Press | 285/226 |
| 3,976,312 | 8/1976 | Murphree | 285/226 X |
| 4,819,965 | 4/1989 | Press et al. | 285/226 X |

FOREIGN PATENT DOCUMENTS 2142893  3/1973  Fed. Rep. of Germany ...... 285/114

Primary Examiner—Dave W. Arola
Attorney, Agent, or Firm—Arnold, White & Durkee

[57] ABSTRACT

In a vibro-isolating joint including two rigid flanges, a flexible cylindrical member such as bellows interposed between the flanges and a plurality of limiting bolts extended through opposed through holes in the flanges, a cylindrical elastomer body is retained in each of through holes in at least one of the flanges and a hollow sleeve is concentrically integrated with the elastomer body so as to protrude one end of the hollow sleeve from an outer surface of the flange so that lock nuts on the limiting bolts engage the protruded ends of the hollow sleeves resiliently supported in the through holes, respectively to thereby provide a high axial thrust together with a vibration isolating property.

11 Claims, 9 Drawing Sheets

FIG. 1

FIG_2

FIG.3

FIG_4

VIBRO-ISOLATING JOINT

BACKGROUND OF THE INVENTION

(1) Field of the Invention

The present invention relates to a vibro-isolating joint having a high vibration isolating property and axial thrust resistance for use in air conditioning equipment, chemical industry equipments and the like.

(2) Related Art Statement

Figure 9:
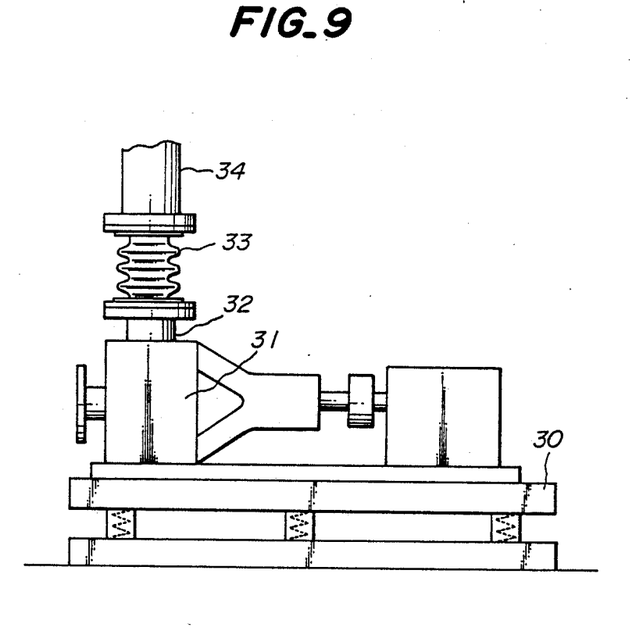
FIG. 9 is a schematic view illustrating an application of a conventional vibro-isolating joint.

Hitherto, there has been used a vibro-isolating joint in air conditioning equipment in order to connect a discharge pipe of a pump to a pipe line. The conventional vibro-isolating joint comprises two rigid flanges and a bellows made of stainless steel, rubber or the like which is interposed between the flanges so as to be extendable when compressed liquid is discharged from the pump to the pipe line. The stainless steel bellows, however, is hard and thus has a low vibration isolating property and sound isolating property, although the rubber bellows has a good vibration isolating property, it lacks durability. Recently, a flexible bellows made of fluorine resin has been conventionally used because of its high vibration isolating property and durability. However, there is a drawback that such a conventional flexible bellows does not have a strength sufficient to sustain an axial thrust. Therefore, as shown in FIG. 9 when a pump 31 is mounted on a vibro-isolating base 30 and a discharge pipe 32 is connected to a pipe line 34 by use of a conventional vibro-isolating joint 33, the pump 31 on the base 30 is violently sunk down by compressed liquid discharged from the pump 31, especially when the pump is first started, and further when the amount of sinking down is over an allowance of deformation, the bellows is broken. In order to prevent the flexible bellows from breaking owing to the over deformation, it has been proposed to insert limiting bolts in opposed through holes formed in the flanges and adjust lock nuts on the limit bolt such as to limit the amount of the deformation of the flexible bellows within an allowable amount. However, there is a problem that when the limit bolts act on the flanges to prevent the flexible bellows from deforming over the allowable amount, the vibration isolating effect of the vibro-isolating joint is fully lost.

SUMMARY OF THE INVENTION

It is an object of the present invention to provide a vibro-isolating joint arranged for satisfying contradictory requirements of securing all of the desired vibration isolating properties, sound isolating properties and large axial thrust, and for controlling the axial thrust to obtain a proper axial thrust while the vibration isolating property is maintained in order to prevent a pump connected by the joint from crushing to a floor surface or the like, or the bellows of the joint from breaking down by an abrupt discharge pressure of the pump.

According to the present invention, in a vibro-isolating joint comprising two rigid flanges each having a plurality of through holes spaced apart in a peripheral direction, a flexible cylindrical member, such as bellows, is interposed between the flanges. A plurality of limiting bolts extend through opposed through holes in the flanges and each is provided with an adjustable lock nut. A cylindrical elastomer body is retained in each of through holes in at least one of the flanges and a hollow sleeve is concentrically integrated with the elastomer body so as to protrude one end of the hollow sleeve from an outer surface of the flange. Accordingly lock nuts on the limiting bolts engage the protruded ends of the hollow sleeves, which are resiliently supported in the through holes, respectively.

According to a preferred embodiment of the invention, the hollow sleeve may be extended through the elastomer body at the center thereof and bonded to the center hole in the elastomer body.

According to another embodiment of the invention, the hollow sleeve may be concentrically embedded in the elastomer body out of the center thereof.

According to a further embodiment, the hollow sleeve and the cylindrical elastomer body may be provided at the periphery thereof with a screw thread, respectively.

According to still another embodiment of the invention, the cylindrical elastomer body may be integrally bonded to the inner surface of the through hole of the flange.

According to a preferred embodiment of the invention, the cylindrical elastomer body may be detachably retained in the through hole of the flange, for example, by tapering the cylindrical elastomer body in the form of a truncated cone so as to be retained in a corresponding tapered through hole in the flange.

According to a preferred embodiment of the invention, the lock nut on the limiting bolt may be provided at the bottom thereof with an abutting washer having a diameter larger than that of the upper end of the elastomer body.

According to still yet another embodiment, the abutting washer may be provided at the bottom surface thereof with a projection having a diameter smaller than that of the upper end of the elastomer body.

According to another embodiment, the hollow sleeve may be provided at the upper end thereof with an abutting washer having a diameter larger than that of the upper end of the elastomer body.

DETAILED DESCRIPTION OF THE PREFERRED EMBODIMENTS

Figure 1:
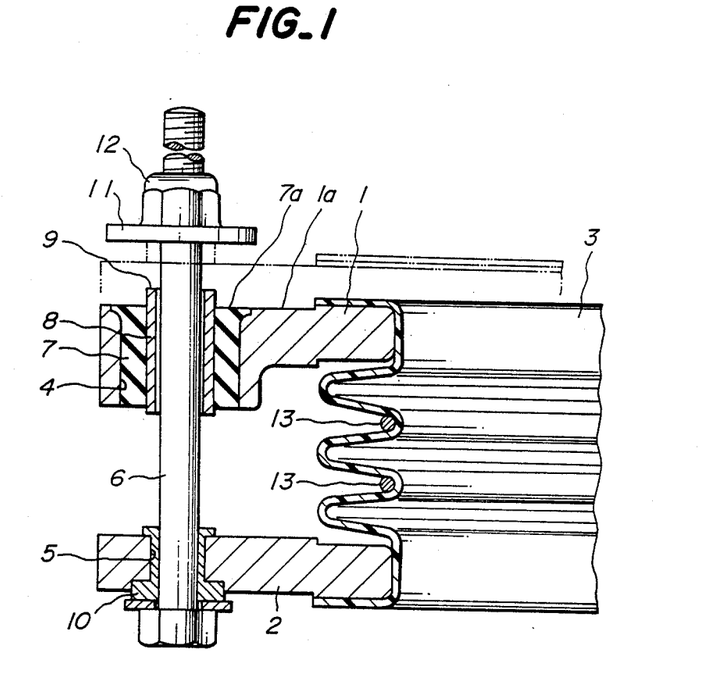
FIG. 1 is a schematic view illustrating an embodiment of the vibro-isolating joint of the present invention.
Figure 2:
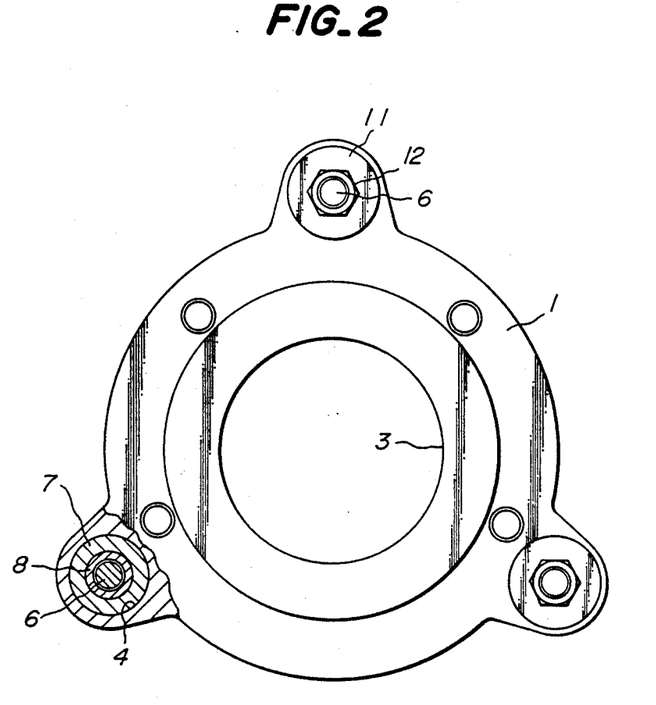
FIG. 2 is a plan view of the vibro-isolating joint shown in FIG. 1.

Referring to FIGS. 1 and 2 illustrating a first embodiment of the vibro-isolating joint according to the present invention the joint comprises upper and lower rigid flanges 1 and 2 and a flexible cylindrical member in the form of a bellows and made of fluorine resin is interposed between the flanges 1 and 2. The flexible cylindrical member 3 may include, at the periphery thereof, a plurality of reinforcing rings 13 spaced apart in an axial direction, if necessary. The flanges 1 and 2 are provided with a plurality of through holes 4 and 5 spaced apart in the circumferential direction, respectively. A plurality of limiting bolts 6 are inserted in the opposed upper and lower through holes 4 and 5 in the flanges 1 and 2, respectively as shown in the drawings. In each through hole 4 in at least one of the flanges 1 and 2, e.g. the flange 1, there is provided an elastomer body 7 which is inserted in the through hole 4 and bonded to the inner surface of the through hole 4. A hollow sleeve 8 is fitted in a central bore formed in the cylindrical elastomer body 7 to concentrically integrate with the cylindrical elastomer body 7, such that is resiliently supported the hollow sleeve 8 in the through hole 4 of the flange 1. An outer or upper end 9 of the hollow sleeve 8 is extruds about 15 mm above the outer or upper surface 7a of the elastomer body 7 which is flush with the outer surface 1a of the flange 1. The elastomer body 7 may be neoprene rubber, butyl rubber, silicon rubber or the like. In this embodiment, each through hole 5 in the another flange 2 is provided with a rubber packing 10 directly fitted therein. The bolt 6 is extended through the rubber packing 10 and the hollow sleeve 8 and is provided with a lock nut 12 having a stopper or abutting washer 11. The lock nut 12 is adjusted to be located at a position spaced upwardly from the end 9 of the hollow sleeve 8 such as to provide a gap of about 10 mm between the bottom of the washer 11 and the top end of the hollow sleeve 8 under a natural condition wherein the cylindrical body 3 is not subjected to any internal pressure. However, when the flexible cylindrical member 3 is subjected to internal pressure and is expanded, the washer 11 of the nut 12 engage the top end 9 of the cylindrical sleeve 8, which is resiliently supported by the elastomer body 3 in the through hole 4 (as shown by the broken lines in FIG. 1).

The outer diameter of the upper end of the elastomer body must be smaller than the outer diameter of the washer 11. The axial thrust of the vibro-isolating joint according to the present invention may be adjusted by changing the diameter or the hardness of the elastomer body. When the axial thrust becomes large, it is necessary to increase a shearing stress by increasing a length of bonding or a length in the axial direction of the elastomer body.

The aforementioned vibro-isolating joint is used in a condition shown by a solid line in FIG. 1 to connect a discharge pipe of a pump to a pipe line. When the flexible cylindrical member 3 is expanded by compressed liquid discharged from the pump, the flange 1 is pushed up to generate an axial thrust determined by a spring constant of the flexible cylindrical member 3 in the same manner as in the prior art until the top ends 9 of the hollow sleeves 8 abut to the washers 11 of the nuts 12, respectively. Further upward movement of the flange 1 causes the hollow sleeves 8 to resiliently push into the through holes 4 of the flange 1 to generate an elastic deformation of the elastomer body 7, and results in a spring constant of the elastomer body 7 being added to the spring constant of the flexible cylindrical member or bellows 3 to rapidly increase the axial thrust. When the top ends 9 of the hollow sleeves 8 are completely pushed in the elastomer body and the washers 11 of the nuts directly contact the upper surface of the flange 1, an upward movement of the flange 1 is stopped to prevent the flexible cylinder 3 from over expanding unduly. Accordingly, a high axial thrust is attainable while preserving the vibration isolating properties.

Figure 3:
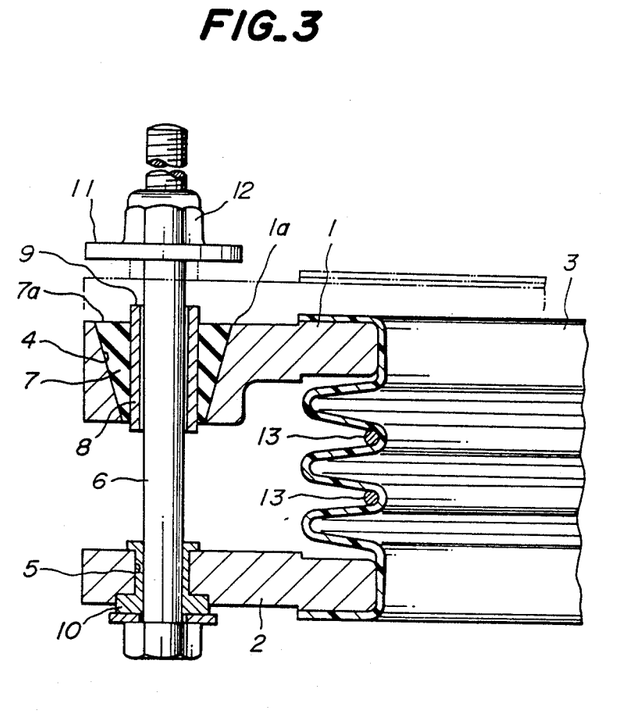
FIGS. 3–7 are schematical views illustrating various embodiments of the vibro-isolating joint of the invention, respectively.

FIG. 3 illustrates a second embodiment having an arrangement similar to the first embodiment shown in FIG. 1, except that the elastomer body 7 is downwardly tapered in the form of a truncated cone and the through hole 4 is correspondingly tapered so as to detachably support the elastomer body 7 in the through hole 4 without bonding to the inner surface of the through hole.

According to this embodiment, the elastomer body can be easily exchanged with new or alternative bodies when the elastomer body deteriorates earlier than the flexible bellows made of PTFE or is changed with other bellows having a different hardness for the purpose of adjusting the axial thrust.

Figure 4:
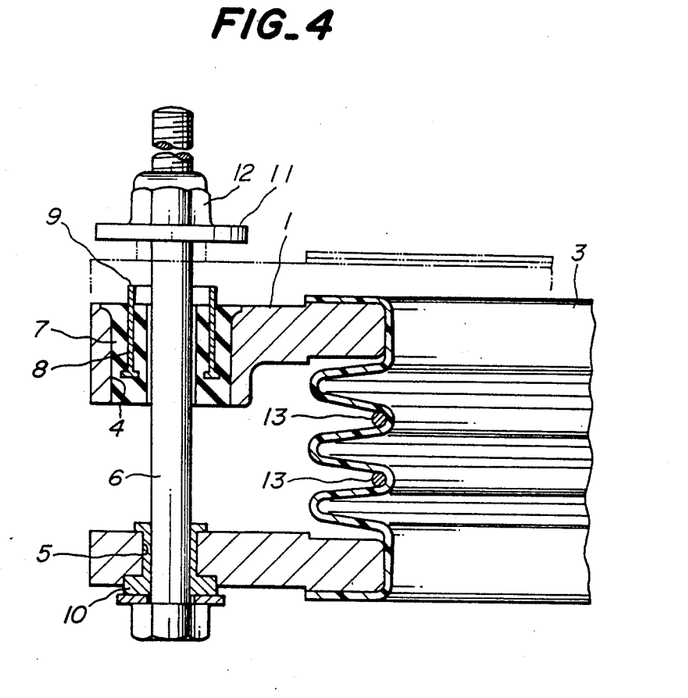

FIG. 4 illustrates other embodiment of the vibro-isolating joint according to the present invention. In this embodiment, a hollow sleeve 8 is concentrically embedded in a cylindrical elastomer body 7 bonded to the inner surface of the through hole 4.

Figure 5:
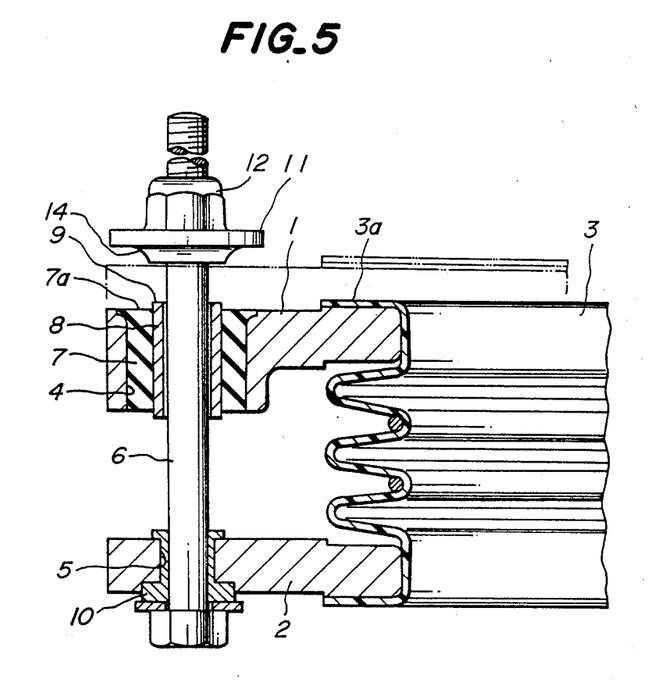

FIG. 5 illustrates a fourth embodiment, wherein a length of a rigid hollow sleeve 8 extended from the upper surface 7a of the elastomer body 7 is limited such that the upper end 9 of the hollow sleeve is substantially flush with the upper surface 3a of the flexible bellows 3, and the washer 11 is provided on the bottom thereof with a projection 14 so as to cooperate with the upper end 9. According to this embodiment, the joint can be easily set into a pipe line without any interference between the extended end portion of the hollow sleeve 8 and a connecting flange of the pipe line.

Figure 6:
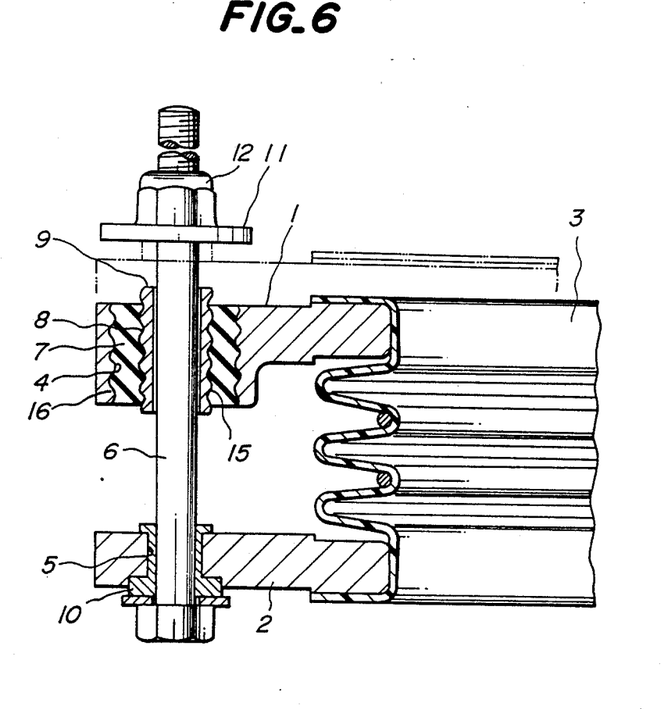

FIG. 6 illustrates a fifth embodiment, wherein the outer surface of the hollow sleeve 8 and the inner surface of the through hole 4 are provided with screw thread 15 and 16 respectively in order to increase a mechanical coupling force or a bonding length therebetween. In this embodiment, the hollow sleeve 9 may be threaded in the elastomer body 7.

Figure 7:
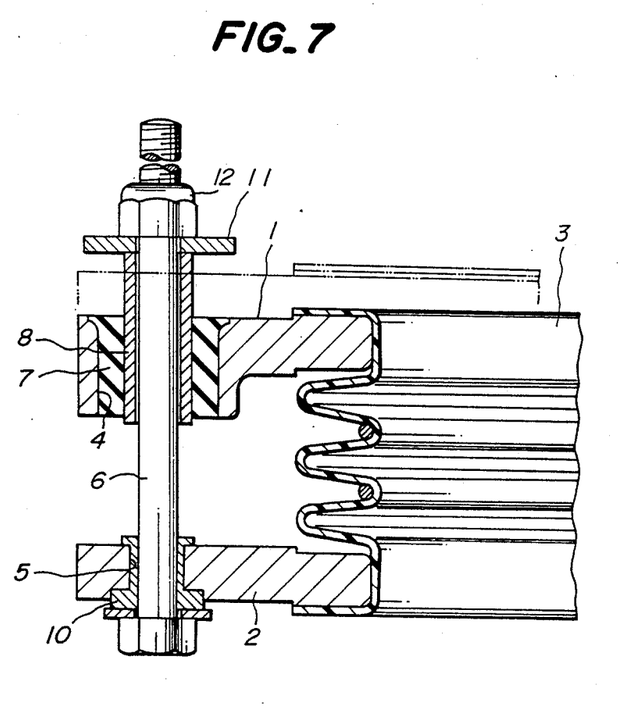

FIG. 7 is a further embodiment according to the present invention, wherein a stopper or seat 11 is rigidly secured to the protruded end 9 of the hollow sleeve 8.

Figure 8:
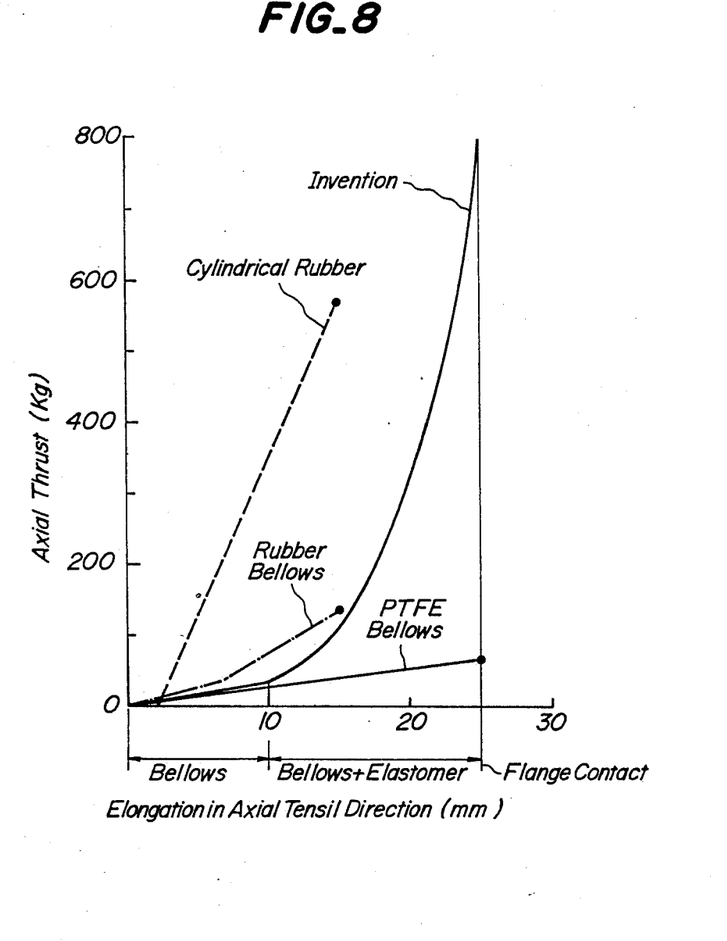
FIG. 8 is a graph showing relations between an elongation in a tensile direction and an axial thrust.

FIG. 8 is a graph showing axial thrusts in the direction of axial tension for various vibro-isolating joints having a 100 A diameter. It is noted from the graph that the vibro-isolating joint according to the present invention exhibits superior properties. Various properties of each of the vibro-isolating joints are shown in Table 1.

TABLE 1

| Type | Spring constant (kgf/mm) | Maximum displacement (mm) | Maximum axial thrust (kg) | Distance between flanges (mm) |
| --- | --- | --- | --- | --- |
| Cylindrical rubber | 38 | 15 | 570 | 240 |
| Rubber bellows | 10 | 15 | 150 | 225 |
| PTFE bellows | 6 | 25 | (150) | 92 |
| Invention | 4 ↓ 26 ↓ 70 | 25 | 800 | 92 |

It is seen from the above description, according to the present invention a large axial thrust can be effected with remaining a vibration isolating property and also can be adjusted in accordance with an allowance of displacement of the bellows or flexible cylinder by changing a position of the lock nut or a material or shape of the elastomer body. Accordingly, when the movement of the pump is large, the axial thrust can be increased by adjusting the lock nut to correct the movement of the pump and the maximum movement of the pump can be limited so as not to exceed the allowance of the displacement of the bellows when the pump is rapidly moved. Furthermore, when the pipes to be jointed are largely shifted, the pipes can be correctly joined within the allowance of displacement of the bellows by utilizing the elasticity of the elastomer bodies.

What is claimed is:

1. A vibro-isolating joint, comprising:
   two rigid annular flange members, each having a plurality of through holes arranged in an axially spaced manner;
   a flexible cylindrical member interposed between said flanges;
   a plurality of limiting bolts extending through opposed through holes in said flange members, each bolt being provided with an adjustable lock nut;
   a plurality of cylindrical elastomer bodies, each retained in each of the through holes in at least one of said flange members; and
   a plurality of hollow sleeve members, each being concentrically integrated with each of said elastomer bodies, said hollow sleeve members having one end which protrudes from one end of said elastomer bodies;
   wherein the lock nuts arranged on the limiting bolts contact the protruded ends of the hollow sleeve members when said flexible cylindrical member expands and forces said flange members away from each other.

2. The joint of claim 1, wherein said flexible cylindrical member consists of bellows.

3. The joint of claim 1, wherein the hollow sleeve members are extended through a center hole formed in the elastomer bodies and are integrally bonded to an inner surface of the elastomer bodies.

4. The joint of claim 1, wherein the hollow sleeve members are concentrically embedded in the elastomer bodies so that the hollow sleeve members are sandwiched between concentric portions of the elastomer bodies.

5. The joint of claim 1, wherein the hollow sleeve members and the cylindrical elastomer bodies each having a screw thread formed at an outer periphery thereof.

6. The joint of claim 1, wherein the elastomer bodies are integrally bonded to the inner surface of the through holes in at least one of said flange members.

7. The joint of claim 1, wherein the cylindrical elastomer bodies are detachably retained in the through holes in at least one of said flange members.

8. The joint of claim 7, wherein the cylindrical elastomer bodies are tapered in the form of a truncated cone and are retained in the through holes in at least one of said flange members which are correspondingly tapered in the form of a truncated cone.

9. The joint of claim 1, wherein the lock nuts are provided with an abutting washer for contacting the protruding end of said hollow sleeve members, and said washer has a diameter larger than that of said one end of said elastomer bodies.

10. The joint of claim 9, wherein the surface of said abutting washer which contacts the protruding end of said hollow sleeve members has a projection form thereon, said projection having an outer diameter which is larger than that of said hollow sleeve members and smaller than that of said one end of said elastomer bodies.

11. The joint of claim 1, wherein said one end of said hollow sleeve members which contacts said locking nuts is provided with an abutting washer having a diameter larger than that of said one end of said elastomer bodies.

* * * * *